United States Patent

Menz

[11] 3,906,075
[45] Sept. 16, 1975

[54] PROCESS FOR EXTRACTING A MANGANESE CONCENTRATE FROM MARITIME MANGANESE ORE

[75] Inventor: Dieter Menz, Peine, Germany

[73] Assignee: Preussag Aktiengesellschaft, Germany

[22] Filed: Oct. 10, 1972

[21] Appl. No.: 296,353

[30] Foreign Application Priority Data
Oct. 12, 1971   Germany............................ 2150785

[52] U.S. Cl. ..................... 423/52; 423/27; 423/150
[51] Int. Cl.. C01g 45/00; C01g 47/00; C01g 57/00; C22b 47/00; C22b 61/00
[58] Field of Search ....... 423/49, 150, 50, 146, 557, 423/558, 605, 27; 75/115, 121

[56] References Cited
UNITED STATES PATENTS

| | | | |
|---|---|---|---|
| 1,348,068 | 7/1920 | Van Arsdale et al................ | 75/115 |
| 2,451,647 | 10/1948 | Allen................................... | 423/52 |
| 3,169,856 | 2/1965 | Mero................................... | 75/115 |
| 3,301,634 | 1/1967 | Fuller................................. | 423/605 |

OTHER PUBLICATIONS

Chemical Engineering Progress–Vol. 50, No. 1, pg. 9–13, "Recovery of Mn from Low Grade Ores" by Allen.

Bureau of Mines R.I. 6361–Hydrometallurgical Recovery of Mn from Manganiferous Slimes and Limestones, pg.8.

*Primary Examiner*—Oscar R. Vertiz
*Assistant Examiner*—Eugene T. Wheelock
*Attorney, Agent, or Firm*—Molinare, Allegretti, Newitt & Witcoff

[57] ABSTRACT

A process for extracting a manganese oxide concentrate of metallic copper, nickel and cobalt from manganese, such as maritime manganese concentrations. The ore is first finely ground and then is leached in an aqueous suspension at temperatures of 90°–100°C. and at a pH value above 3 with sulfur dioxide or sulfurous acid and the resulting manganese sulfate is separated by crystallization and subsequent thermal decomposition of the manganese sulfate. The aqueous solution is separated from the residue in a known manner.

4 Claims, 1 Drawing Figure

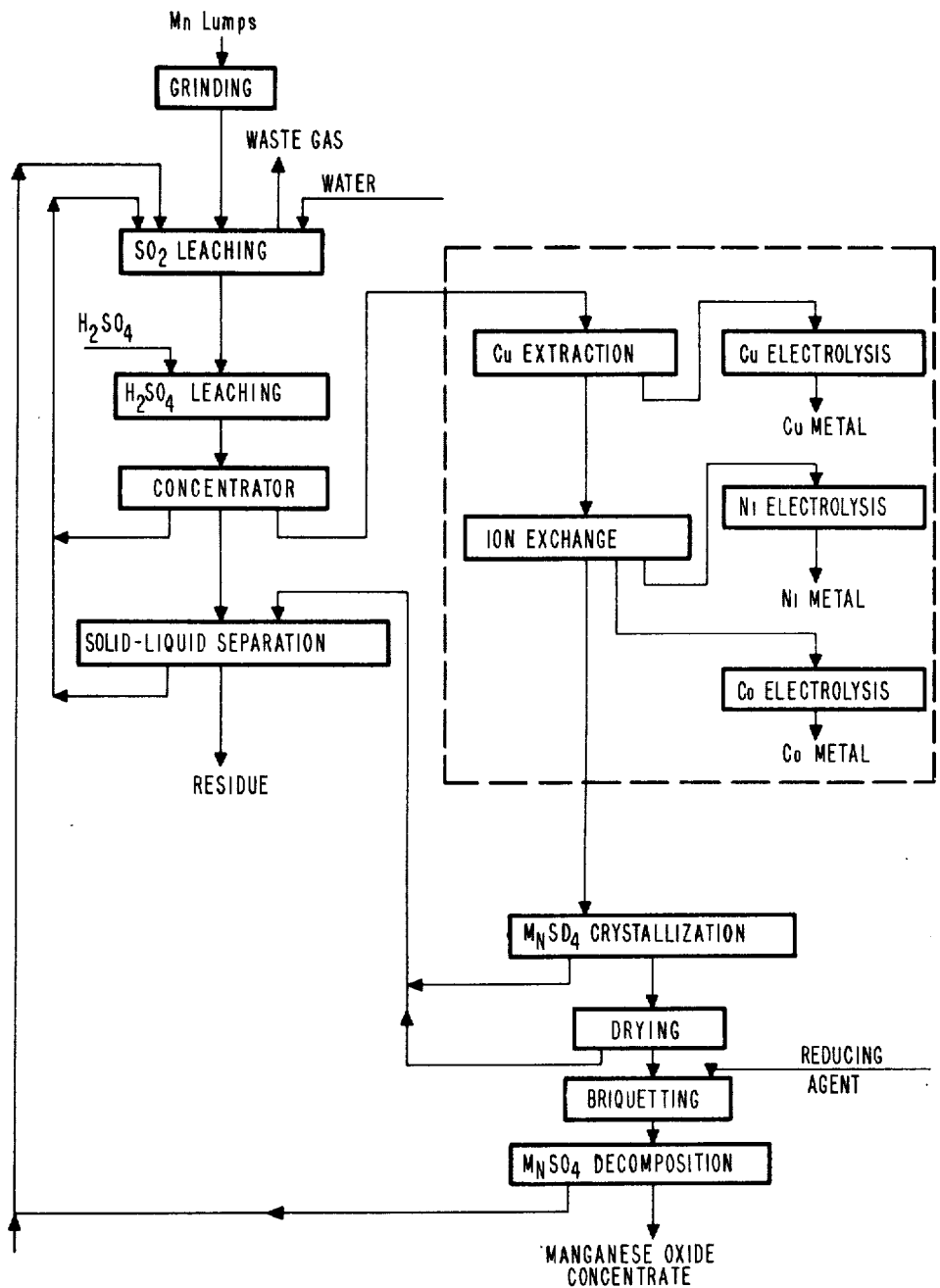

PROCESS FOR EXTRACTING A MANGANESE CONCENTRATE FROM MARITIME MANGANESE ORE

BACKGROUND OF THE INVENTION FIELD OF THE INVENTION and DESCRIPTION OF THE PRIOR ART This invention relates to a process for extracting a manganese oxide concentrate of metallic copper, nickel and cobalt from manganese ores, and more particularly from maritime manganese concentrations, such as manganese lumps, by using a sulphur dioxide and/or sulphurous acid leaching a separation of the manganese sulphate by crystallization, and a subsequent thermal decomposition of the manganese sulfate.

With the exploitation of the mineral wealth of the oceans of the World, the dressing of ores with high proportions of tetravalent manganese should be of particular economic interest. The most important sediments of the ocean bed, from an economic point of view, are the manganese lumps. These manganese lumps constitute an ore reserve which represents 5000 times the amount of cobalt, 4000 times the amount of manganese, 1500 times the amount of nickel and 150 times the amount of copper of all stocks which are today considered as capable of being extracted on the mainland of the World. The manganese lumps from the Pacific Ocean are particularly valuable because of their manganese content and because they have high proportions of non-ferrous metals. According to our knowledge, at the present time, the average content of the most important metals in the manganese lumps in the Pacific Ocean have the following values:

| | |
|---|---|
| manganese | 24% |
| nickel | 1.0% |
| copper | 0.6% |
| cobalt | 0.3% |
| iron | 14% |

In view of their high manganese content, the manganese lumps should, of course, be classified as manganese ores, but their comparatively high nickel, copper and cobalt content causes great interest in making strong efforts to extract these high-grade metals, in addition to manganese, when these ores are dressed.

It is known that the manganese content of the manganese lumps can be decomposed in an aqueous suspension with sulfur dioxide gas or with sulfurous acid in accordance with the following reaction:

$$MnO_2 + SO_2 = MnSO_4$$

In addition to the above reaction, nickel, copper, cobalt and iron are also brought into solution.

The separation of the nickel, copper, cobalt and iron from the manganese can be accomplished with known procedures precipitating these metals in the solution as sulfides, or by cementing the copper and precipitating the nickel and cobalt as sulfides or by separating these metals by use of solid ion exchangers; also the copper can be extracted by liquid ion exchangers and by precipitating the other two metals as sulfides or by separating the other metals by solid ion exchangers; or further the copper, nickel and cobalt can be separated by using solid ion exchangers. The mixed sulfides or separated metal-containing solutions can be converted to the metals by known processes, advantageously by electrolytic procedures.

After separating the metals, the manganese can be crystallized from the solution by known processes, as manganese sulfate, at about 200°C and under pressure.

The solid manganese sulfate can be thermally decomposed by a known process, by the addition of carbon, at temperatures from 800° to 1000°C to manganese oxides of varying composition and to sulfur oxide. The sulfur dioxide is then returned to the process for the decomposition of the ore. This return of the sulfur dioxide makes the entire process economical. However, this decomposition process, using $SO_2$, has a number of significant disadvantages.

Thus, with the decomposition or dressing of ores with high proportions of tetravalent manganese and of manganese lumps, with sulfur dioxide or sulfurous acid, the manganese and also iron are dissolved primarily as a ferric sulfite complex and secondarily as ferrous dithionate. This causes difficulties with the removal of the iron from the leaching solution. As shown by leaching tests, for example, on manganese lumps, about 50% of the iron content is dissolved. In purifying the leaching solution from the iron, it is true that the iron can be removed as hydroxide and basic iron sulfate, but the deposit which is formed contains sulfate and thus causes a loss of sulfur. Furthermore, this deposit is usually only capable of being separated with very great difficulty.

Furthermore, the continuous separation of the crystallizate and the mother liquor with the crystallization of manganese sulfate under pressure remains, thus far, unsolved. However, a continuous operation also necessitates a continuous control as to the crystallization.

Finally, with the thermal decomposition of the manganese sulfate, in a manner known per se, with carbon, it is necessary to have high temperatures, from 800° to 1000°C., and long reaction times, up to 1.5 hours.

SUMMARY OF THE INVENTION

It is the object of the present invention to provide a process for extracting a manganese oxide concentrate, having, high proportion of non-ferrous metals, by using $SO_2$, which permits a continuous operation of the plant and thus an economic extraction of the metals.

This object is accomplished by my process wherein the ore is finely ground and leached with sulfur dioxide and/or sulfurous acid, in aqueous suspension, at temperatures from 90° to 100°C. and at a pH value above 3; and the aqueous solution is separated from the residue and processed in a known manner. A particularly advantageous result is obtained in the invention if the aqueous suspension already contains added manganese sulfate at the start of the leaching step.

BRIEF DESCRIPTION OF THE DRAWINGS

The accompanying drawing is a flow diagram illustrating the process of the invention.

DETAILED DESCRIPTION OF THE PREFERRED EMBODIMENT

The process of the invention involves the steps of finely grinding the manganese ore and leaching with sulfur dioxide and/or sulfurous acid, in aqueous suspension, at temperatures from 90° to 100°C. and at a pH value above 3; and the aqueous suspension is separated from the residue and processed in a known manner. It is particularly advantageous if the aqueous suspension contains added manganese sulfate at the start of the leaching step.

The quantity of the added manganese sulfate is between 100 and 200 g/l.

It is advantageous to proceed in such a way that, after the leaching with sulfur dioxide and or sulfurous acid, but before the separation of the residue, the still undissolved fraction of manganese, nickel, copper and cobalt, which is in the residue, is leached out by a stepwise addition of a mineral acid or the separated residue is separately leached with a mineral acid.

By allowing the sulfur dioxide to react with the aqueous suspension of the ore at a pH value above 3 and at temperatures between 90° and 100°C., the reaction of sulfur dioxide with the iron oxides always present in the ores is prevented and thereby the dissolving out of the iron is avoided. For the prevention of the solubility, it is particularly advantageous if the reaction mixture contains, at the start, relatively large quantities of manganese sulfate. The manganese dioxide and the other metals, such as nickel, copper and cobalt, then react quickly with the sulfur dioxide and are leached out to 70 to 80%.

The iron, in this case, remains undissolved in the residue in the form of its oxides.

These fractions of manganese, nickel, copper and cobalt in the ore which still remain in the residue can thereafter be leached by mineral acids, advantageously by sulfuric acid, the acid being added to the suspension to a pH value of 2, without simultaneously leaching the iron.

This procedure has the advantage that the removal of the iron is dispensed with, whereby sulfur losses are avoided and the suspension can be easily filtered.

With the crystallization of the solution freed from nickel, copper and cobalt, the result was obtained that, during the crystallization process at temperatures from 180° to 200°C., the manganese sulfate, in small quantities, is cracked hydrolytically to manganese hydroxide and sulfuric acid. The manganese hydroxide covers the surface of the freshly formed $MnSO_4$ crystals and crystal nuclei and as a result, prevents the dissolving of the crystals with a rapid cooling. This offers the possibility of the sludge removed from the crystallizer being quickly cooled in heat exchangers, advantageously counter-current with the fresh manganese sulfate solution, and the separation of the slude being carried out under atmospheric pressure.

The thermal decomposition of the manganese sulfate was precisely effected with the use of carbon in granulated form, such as coke or wood charcoal, the manganese sulfate being, first of all, partially reduced to manganese sulfide, which reacts with the excess manganese sulfate, to manganese oxide and sulfur dioxide. In contrast thereto, however, the carbon necessary for the reduction is now brought in accordance with the invention directly onto the surface of the manganese sulfate crystals, by the manganese sulfate crystals being mixed with heavy liquid hydrocarbons and/or their cleavage and cracking products, for example, with bitumen, the softening point of which is between 60° and 150°C., whereby the crystals are covered, for example, on all sides by the bitumen. Thereafter, the mixture is briquetted, and the briquettes are then heated in an internally and/or externally heated oven or furnace up to a temperature of 400° to 500°C. In this way, the manganese sulfate crystals are enclosed by very finely divided carbon, so that the reduction of the manganese sulfate to manganese sulfide begins at about 500°C. With further raising of the temperature up to 800°C., the reduction is continued until the carbon is consumed, but concurrently therewith there also takes place the reaction between the formed manganese sulfide and the still unreduced manganese sulfate to manganese oxide and sulfur dioxide.

The process as set forth is expediently carried out in an internally and/or externally heated furnace or oven, the cleavage gases of the hydrocarbons and hydrocarbon cracking products preferably being so utilized in accordance with the invention for heating the oven that these products are extracted from the cooler zone of the oven and are burnt in the hot zone of the oven, mixed with air and/or oxygen.

by this conversion of the manganese sulfate to manganese oxide, a considerable saving in energy can be achieved, and together with the previously indicated method of crystallizing the manganese sulfate, it is possible to operate continuously.

I claim:

1. A process for extracting a manganese concentrate, copper, nickel and cobalt from maritime manganese ore, containing said elements in admixture with iron, said process comprising the steps of finely grinding said ore, leaching said finely ground ore, in acidic aqueous suspension, with sulfur dioxide or sulfurous acid at a temperature of 90°–100°C. and at a pH value above 3.0, to form an aqueous solution including manganese sulfate, without dissolving the iron, and a leach residue containing undissolved iron oxides, adding manganese sulfate to said aqueous suspension at the start of said sulfur dioxide or sulfurous acid leaching step, separating said aqueous solution from said residue, separating copper, nickel and cobalt from said aqueous solution, and thereafter recovering said manganese concentrate from said aqueous solution.

2. The process of claim 1 wherein 100-200 g of manganese sulfate per liter of said aqueous suspension are added at the start of said leaching step.

3. The process of claim 1 wherein said leaching step includes the additional step of sulfuric acid leaching after said sulfur dioxide leaching.

4. The process of claim 1 wherein said recovering step includes crystallizing said manganese sulfate in said aqueous solution, and thermally decomposing said crystallized manganese sulfate to manganese oxide and sulfur dioxide.

* * * * *